US005355631A

United States Patent [19]
Whittington et al.

[11] Patent Number: 5,355,631
[45] Date of Patent: Oct. 18, 1994

[54] REGULATED FORCE AND SPEED CONTROL OF A SURFACE TREATING WHEEL

[75] Inventors: Glenn A. Whittington, Lino Lakes; Steven J. Austin, Minneapolis, both of Minn.

[73] Assignee: Robotics and Automation Corporation, Minneapolis, Minn.

[21] Appl. No.: 978,727

[22] Filed: Nov. 19, 1992

[51] Int. Cl.⁵ ............................................. B24B 49/00
[52] U.S. Cl. ...................................... 451/237; 451/21
[58] Field of Search ............. 51/99, 91 R, 96, 165.87, 51/165.88, 165.92

[56] References Cited

U.S. PATENT DOCUMENTS

| | | | |
|---|---|---|---|
| 2,955,388 | 10/1960 | Lavner | 51/99 |
| 2,982,056 | 5/1961 | Edqvist | 51/99 |
| 3,667,166 | 6/1972 | White | 51/99 |
| 4,468,892 | 9/1984 | Giebmanns | 51/99 |
| 4,502,251 | 3/1985 | Everett | 51/99 |
| 4,514,933 | 5/1985 | Baskett | 51/99 |
| 4,604,835 | 8/1986 | Borin | 51/165.87 |
| 4,926,604 | 5/1990 | Hara | 51/99 |
| 4,947,015 | 8/1990 | Lach | 51/165.87 |
| 5,077,941 | 1/1992 | Whitney | 51/165.87 |
| 5,121,580 | 6/1992 | Bellenoue | 51/99 |

*Primary Examiner*—Bruce M. Kisliuk
*Assistant Examiner*—B. Bounkong

[57] ABSTRACT

An automatic surface treating work wheel having controlled speed and pressure for finishing the surfaces of various materials to achieve desired finish results. The pressure is controlled by a counterbalance system using two air pressurized pneumatic cylinders.

2 Claims, 5 Drawing Sheets

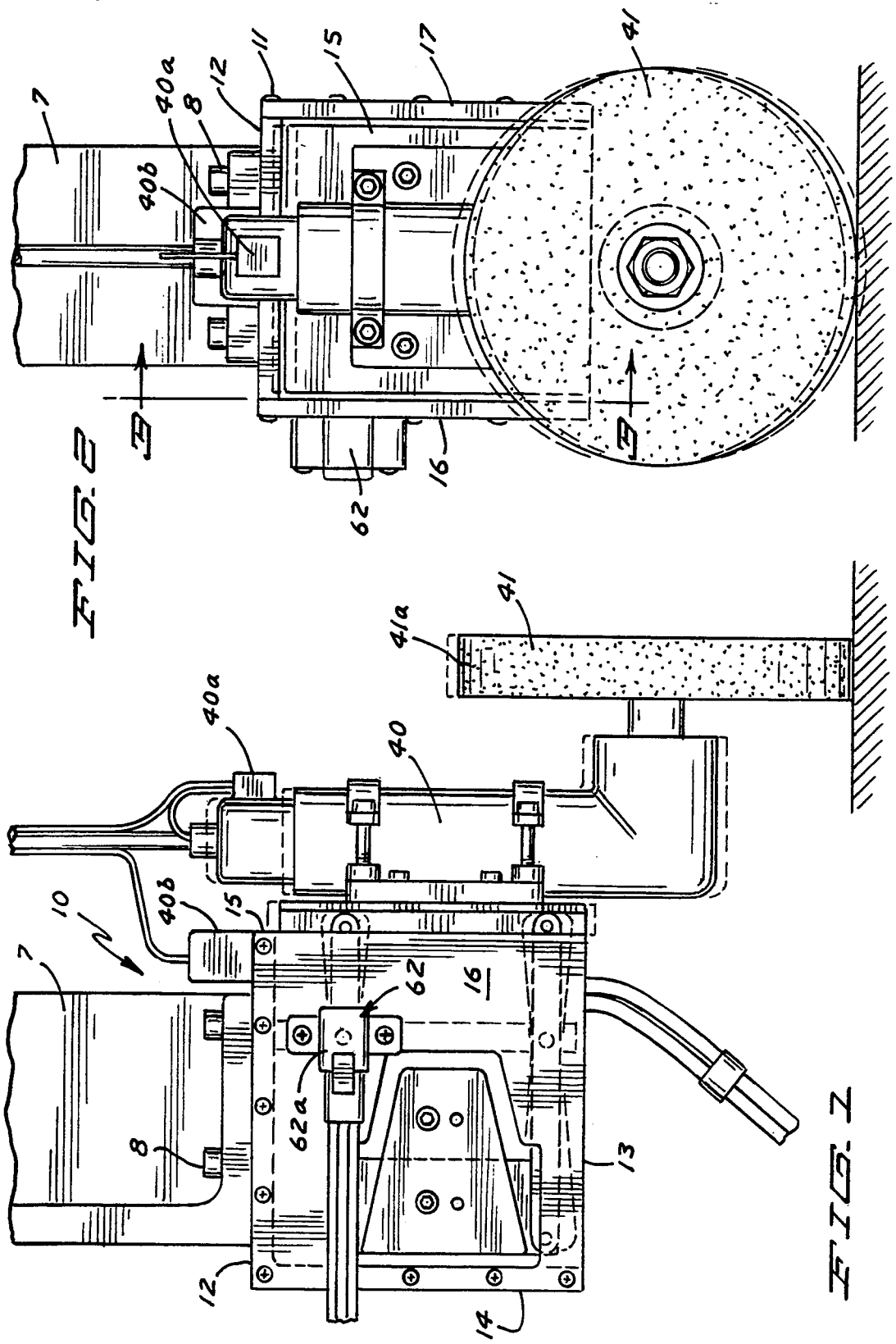

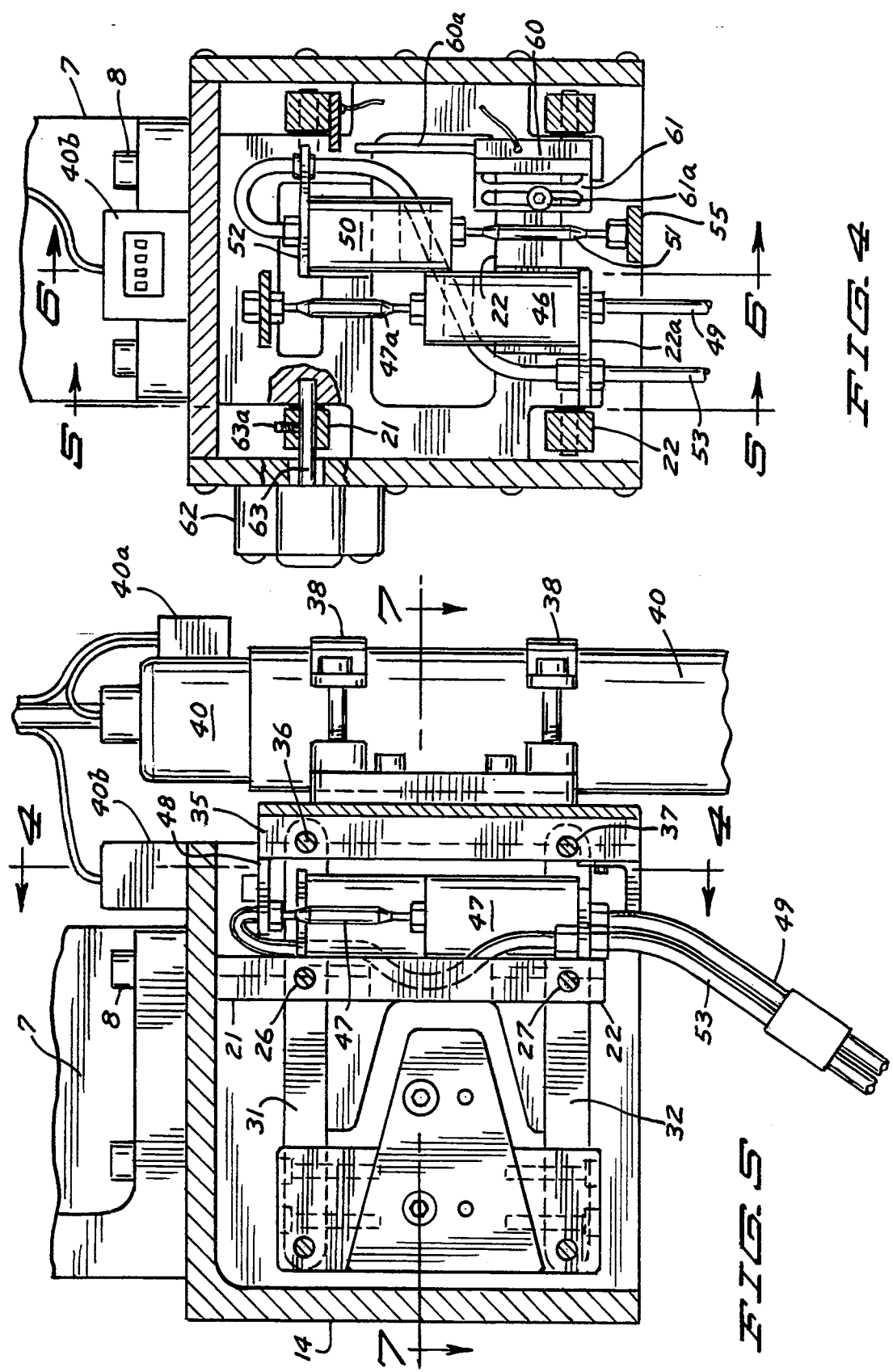

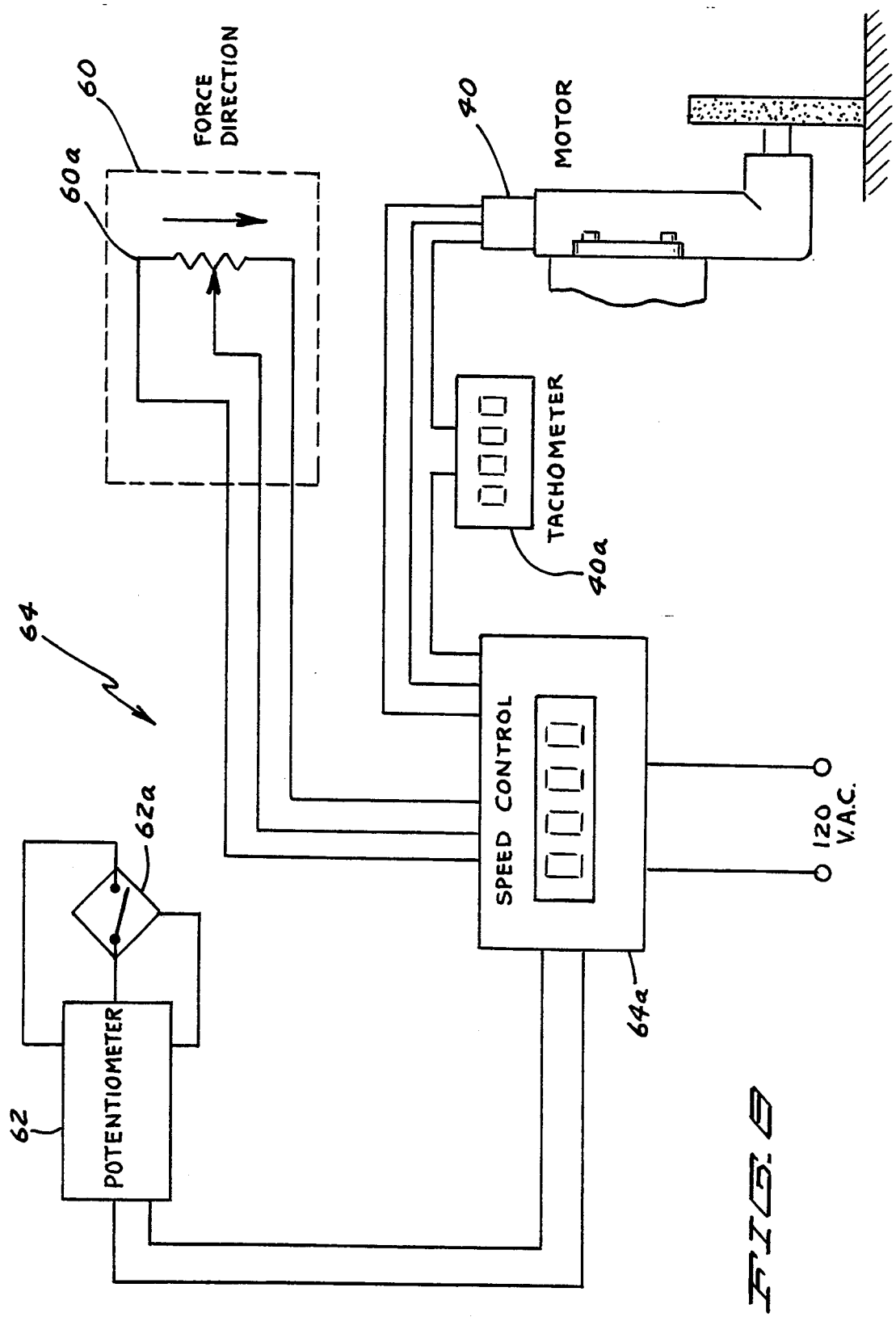

REGULATED FORCE AND SPEED CONTROL OF A SURFACE TREATING WHEEL

BACKGROUND OF THE INVENTION

1. Field of Invention

This invention relates to automatic regulated control of the speed and pressure of a metal deburring, finishing or polishing device.

2. Description of the Prior Art

Surface finishing of metal, plastic or wood surfaces traditionally has been a manual work effort exercising power operated grinding and polishing equipment. The finished surfacing results from the application of a worker's skill or a machine preset to remove a fixed portion of a typically flat surface in an effort to achieve a desired finish result.

There are adverse aspects to this type of operation. The nature of the work effort creates a dust laden atmosphere in the immediate work area which is potentially damaging to the eyes and respiratory system of the worker. Further the repetitive motion of applying the operating tool to finish the surface has an adverse result in many such workers in development of the carpal tunnel syndrome. This results in an excessive operating expense.

It is desirable to provide a very much improved working arrangement for this type of work effort.

SUMMARY OF THE INVENTION

It is a principle object of the invention herein to automate the work of deburring, finishing or polishing molded, cast, forged or machined surfaces.

It is a further object herein to have an automated robot or an automatic machine to perform the finishing treatment of surfaces by applying a regulated force and a regulated surface speed for the purpose of achieving uniform results.

It is also an object herein to provide a signal to a motor speed control to increase the speed of the power source motor driving the surface treatment media to maintain a relatively constant peripheral surface speed of the surface in contact with the workpiece as the media is worn away decreasing the diameter of the media, reducing the circumference which would otherwise result in a reduced surface speed.

Other objects and advantages of the invention will be set forth in the following description made in connection with the accompanying drawings in which like reference characters refer to similar parts throughout the several views.

BRIEF DESCRIPTION OF THE DRAWINGS

FIG. 1 is a side elevational view with portions being broken away;

FIG. 2 is a front elevational view with a portion broken away;

FIG. 4 is a view in vertical section taken on line 4—4 of FIG. 5 as indicated;

FIG. 5 is a view in vertical section taken on line 5—5 of FIG. 4 as indicated;

FIG. 8 is a schematic showing of a control circuit.

DESCRIPTION OF A PREFERRED EMBODIMENT

Figure 3:
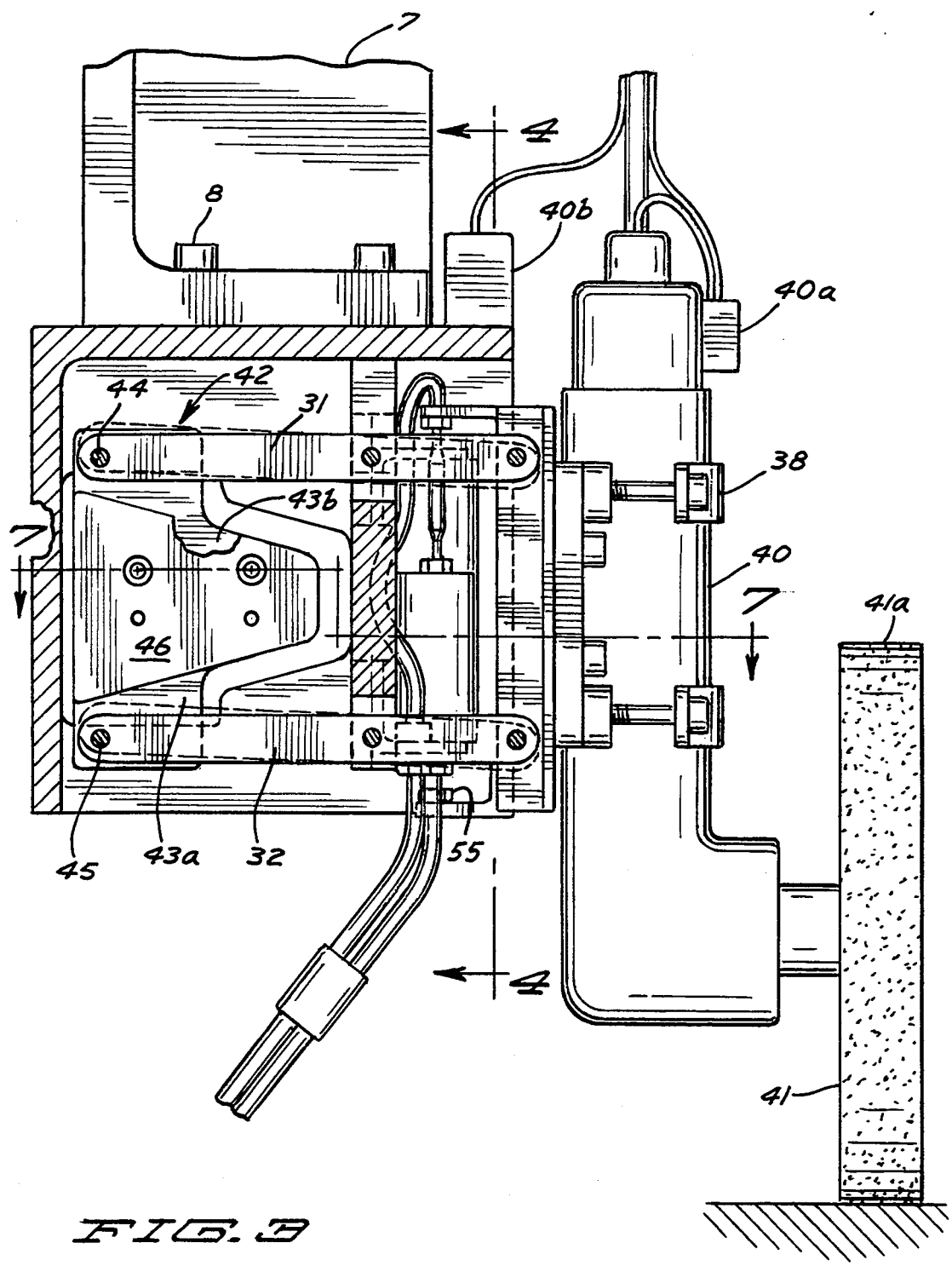
FIG. 3 is a view in vertical section taken on line 3—3 of FIG. 2 as indicated.

Referring to the drawings and more particularly to FIG. 1, the device comprising the invention herein is indicated generally by the reference numeral 10 and as shown said device is in the general form of a cube. Said device has a top wall 12, a bottom wall 13, a front wall 15, a rear wall 14 and side walls 16 and 17. The walls are secured by screws 11 for easy removal.

Figure 6:
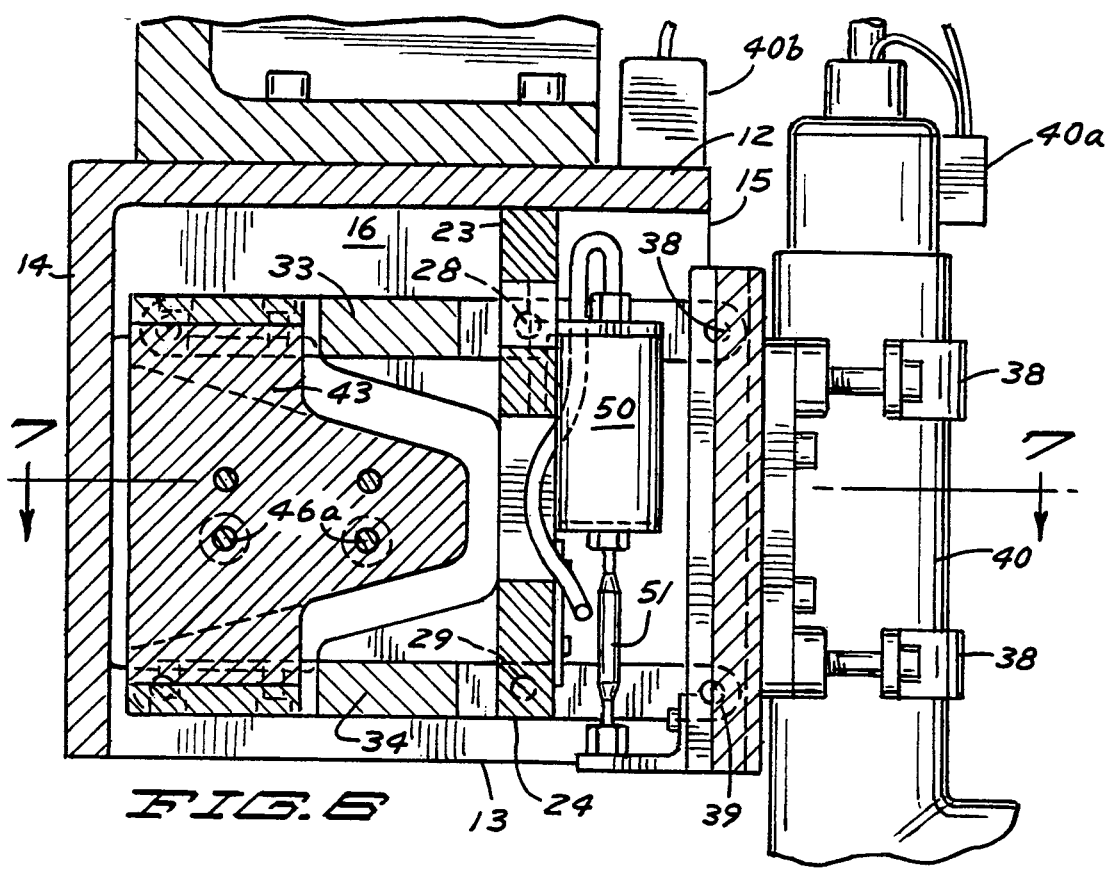
FIG. 6 is a view in vertical section taken on line 6—6 of FIG. 4 as indicated.

Referring to FIGS. 5 and 6, extending between the side walls 16 and 17 and spaced inwardly of said front wall are transversely spaced pairs of support members 21-22 and 23-24. Pivoted to the outer side of each of said support members with the use of low friction bearings as at 26-27 and 28-29 are vertically spaced pairs of lever arms 31-32 and 33-34. Said lever arms extend somewhat beyond the plane of said front wall which has cut outs to be substantially an open faced wall.

Pivotally mounted onto the ends of said lever arms extending through said front wall is a tool mounting plate 35 being pivoted at its sides to said lever arms as at 36-37 and 38-39. This is a conventional pivot attachment using low friction bearings.

As shown here as in FIG. 1, said tool mounting plate 35 is oriented for a predetermined amount of vertical movement as will be further described.

Conventionally mounted onto said mounting plate 35 by appropriate clamps or brackets 38 is a powered tool 40 having a deburring, finishing or polishing wheel 41, whichever is required for a particular job, and the same may be self powered or though not here shown may be connected to a power source.

Said lever arms extend rearwardly to a point of clearance with said rear wall 14.

Said apparatus 10 for purposes herein has appropriate threaded apertures present in its side 12 for mounting as onto a supporting member 7 which may be a convenient arm and bolts 8 are indicated as the securing means.

Figure 7:
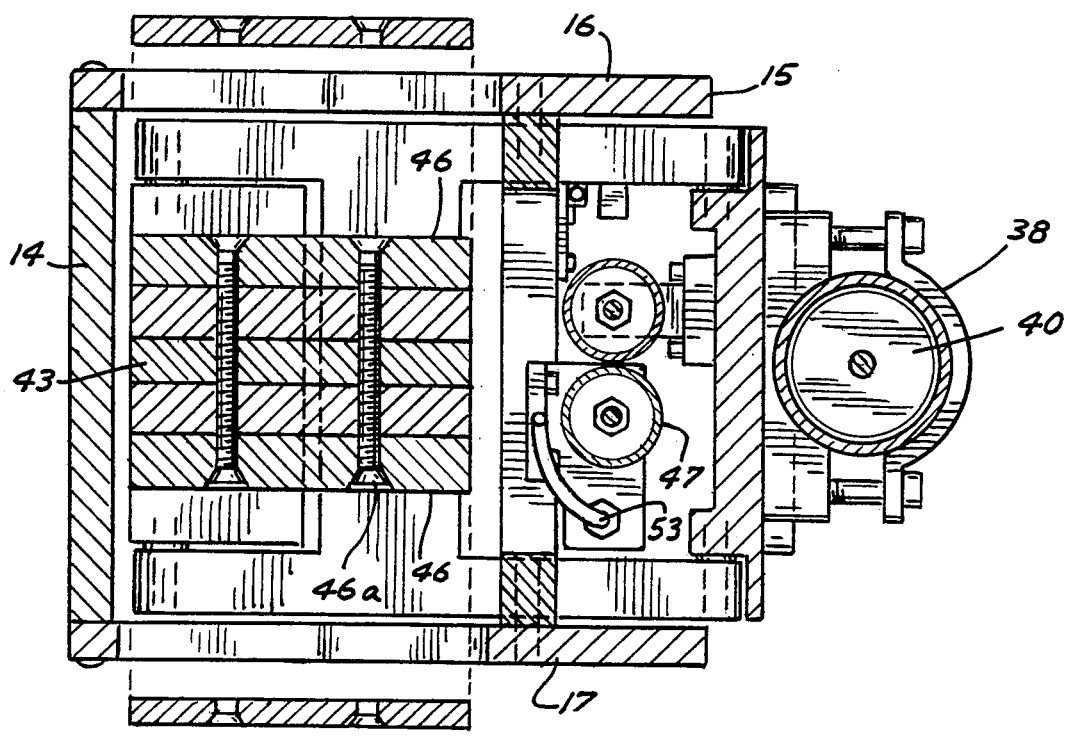
FIG. 7 is a view in horizontal section taken on line 7—7 of FIG. 5 as indicated.

Mounted onto the rearward extension of said lever arms is a counterbalance 42 comprising a base plate member 43 having a rectangular base portion 43a and a central v-shaped forwardly projection portion 43b. Said base plate is disposed centrally laterally between the rearward portion of said lever arms and is pivoted to said arms by cross rods 44 and 45. Adapted to be attached to said base plate are weight members 46 disposed as shown in FIGS. 3, 6 and 7 between said lever arms at one or both sides of said base plate and being tapered in width in projecting forwardly to substantially overlie the forward projecting portion of said base plate. The additional weights or weight plates are secured to said base plate by bolts 46a.

Said counterbalance member shall bear such weight as to counterbalance the tool 40 and its wheel 41 utilizing the low friction bearings used together with the assistance of a pneumatic cylinder to be described.

Attached to said support member 22 by an appropriate clamp or bracket 22a is a low breakaway pneumatic cylinder 47 having its piston 47a engage an angle member 48 mounted onto said tool mounting plate 35 as shown in FIGS. 4 and 5. An air pressure tube 49 runs to a controlled source of pressurized air and the force needed for the final exact counterbalancing is provided by air pressure through this tube acting upon the piston 47a engaging said angle member 48.

Thus the wheel 41 of said tool 40 is in effect weightless in being applied to a workpiece.

A second pneumatic cylinder 50 is mounted onto said support member 21 by an appropriate clamp or bracket 52 and has a piston 51 upon which pressure is exerted through a tube 53 which runs to a controlled source of pressurized air not here shown. By means of this piston bearing against the angle member 55 secured to the tool mounting plate 35, the exact pressure is applied to the wheel 41 as is required for a particular job undertaken.

As shown here, the edge 41a of said wheel is used as the working surface and as will be noted, the movement of the mounting plate is vertically.

The front wall 15 of said device has substantially an open face through which said lever arms 31-34 extend providing for limited vertical movement for said mounting plate 35.

In many job applications of said wheel, during the course of its work, its edge face will wear reducing the diameter of the wheel. The device as described will maintain the preset force against the workpiece by pneumatic pressure as described so long as the stroke travel of the wheel is not greater than the limit of vertical movement of said mounting plate. When said wheel 41 wears to the extent that its decrease in diameter is greater than the vertical limit of movement of the tool mounting plate, a suitable sensor will indicate the need for a wheel replacement or an adjustment of the tool mounting plate for which provision can be made though not here indicated. Such a sensor may be such as a conventional proximity or an optical sensor.

Referring to FIG. 4, a proximity sensor is here indicated at 60 held by a plate bracket 61 adjustably secured by a screw 61a and said bracket is carried by the support member 22. Extending upwardly from said sensor is a sensing tube 60a which for purposes herein is indicated as being an inductive sensor, when the lever arm 31 pivots sufficiently to indicate it is reaching a maximum limit of movement, the same will be sensed by the sensor 60 and as indicated in the control circuit of FIG. 8, as a signal to the operator, said circuit to be described. The extended movement of the lever arm results from the wear of the wheel 41.

As the edge of the wheel 41 wears, another change occurs and that is the peripheral or edge surface speed of the wheel 41 decreases.

The signal of this condition is provided as a portion of a reference voltage proportional to the stroke distance remaining on the tool mounting plate by means of a rotary potentiometer 62 which has a rotary motion provided by its attachment to an elongated support shaft 63 passing through to be affixed to the lever arm 21 and calibrated to the position of the beginning of a stroke by tightening a set screw 63a at the desired point of the potentiometer rotation value to achieve the desired value of the reference voltage applied.

Referring to FIG. 8, a control circuit 64 is shown in which the proximity sensor 60 is indicated as represented in the circuit and upon sensing the limit of travel or movement of the mounting plate by means of the lever arm 31, it sends a signal to the speed control member 64a. Coordinated with this is the control exercised by the potentiometer which is connected to the same lever arm as is sensed by the sensor 60.

The motor represents the powered tool and as shown in FIG. 1, in connection therewith is the tachometer 40a and speed control 64a.

When the preset limits are reached as sensed, the overtravel signal indicator 62a is energized and it emits a signal to the operator who then will stop the machine and make the necessary adjustments. The operation may be resumed as with a new wheel 41 being installed.

Thus there is provided automatically a regulated force and a regulated surface speed to achieve uniform results in applying a workwheel for deburring, grinding or polishing and the like whereby each workpiece will be identical in its treatment and end result and avoided are the adverse effects when such work is done with manual effort.

It will of course be understood that various changes may be made in the form, details, arrangement of the device of the invention without departing from the scope of the applicant's invention which, generally stated consists in an apparatus capable of carrying out the objects above set forth, such as disclosed and defined in the appended claims.

What is claimed is:

1. A regulated force and speed control device for a surface treating wheel comprising,
   a housing,
   a tool mounting plate in connection with said housing,
   a powered tool mounted onto said plate having a work wheel to engage a surface for treatment,
   counterbalance means including weights in said housing in connection with counterbalancing said powered tool and said work wheel,
   said counterbalance means suspending said mounting plate and said powered tool thereon,
   means in connection with said counterbalance means pivotally supporting said mounting plate and powered tool for limited vertical movement thereof,
   a pneumatic cylinder having a piston operated by a controlled source of pressurized air engaging said mounting plate to perfect a precise counterbalance of said powered tool and said work wheel to render said powered tool and said work wheel weightless, and
   a second pneumatic cylinder having a piston operated by a controlled source of pressurized air to apply constantly the specific controlled pressurized air to said mounting plate and thence to said work wheel which is required for engagement of said work wheel with a specific workpiece,
   a proximity sensor in connection with said second pneumatic cylinder, said sensor having an inductive sensing tube sensing the movement of said mounting plate which is directly responsive to a reduction in the diameter of said work wheel due to the wear of its surface causing the pressure of said piston to increase in accordance with said wear of said work wheel to maintain a preset pressure against the workpiece,
   a rotary potentiometer-like means in connection with the powered tool upon said mounting plate responding to a change in reference voltage to achieve the reference voltage required to maintain a constant speed of said work wheel.

2. The structure of claim 1, wherein
   said change in reference voltage results from a reduction in the diameter of said work wheel due to the wear of tis surface and a consequent reduction of its speed causing said last mentioned means to achieve a reference voltage to maintain a constant speed of said work wheel.

* * * * *